3,075,405
VIBRATION DAMPER
Henry Krebs, Detroit, Mich., assignor to General Motors Corporation, Detroit, Mich., a corporation of Delaware
Filed May 15, 1961, Ser. No. 109,916
11 Claims. (Cl. 74—574)

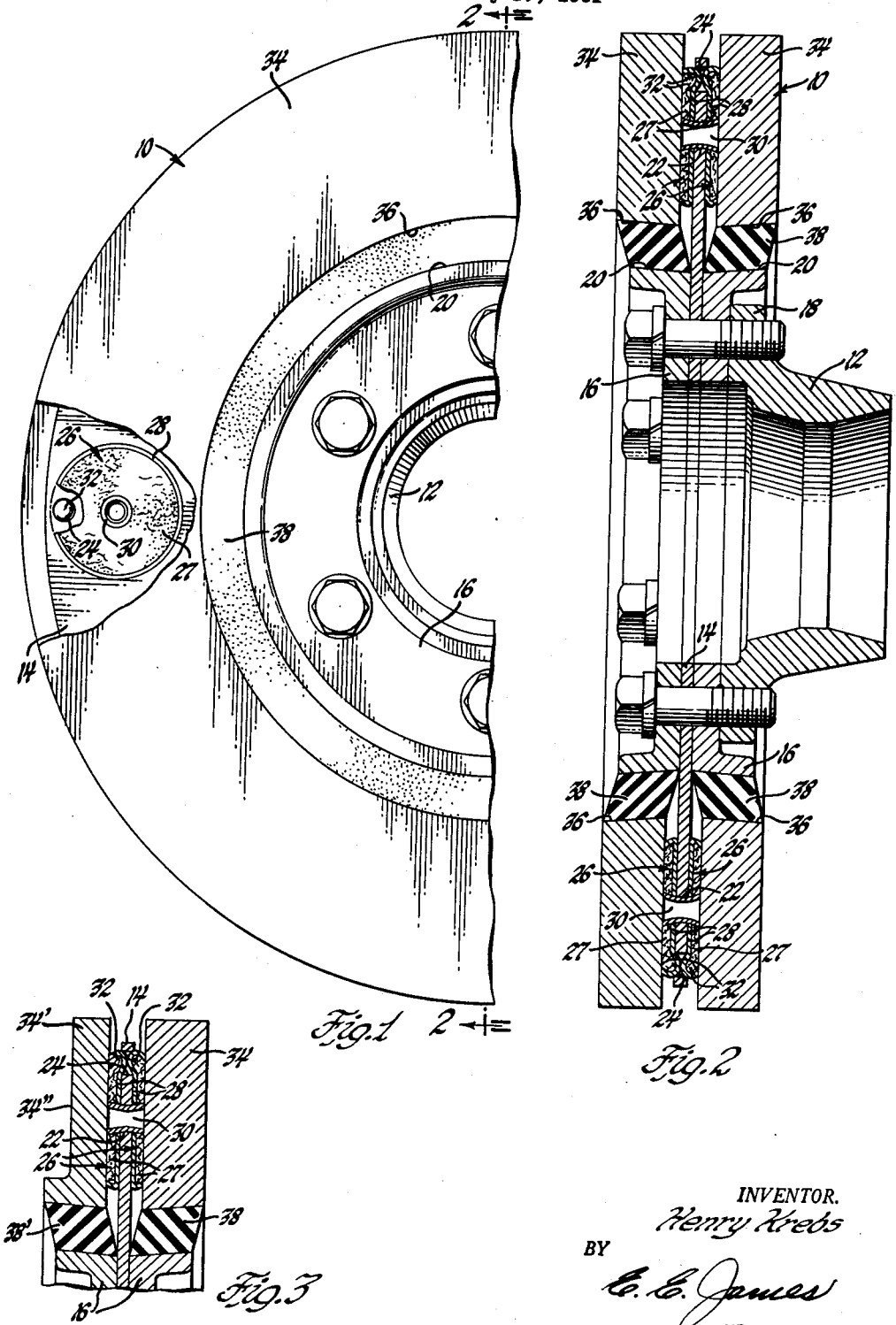

This invention relates to vibration dampers, and more particularly to torsional vibration dampers for rotating shafts, such as the crankshaft of an internal combustion engine.

In the past, various arrangements have been provided for damping absorption of the torsional vibrations of an engine crankshaft by resilient or frictional snubbing of a driven flywheel inertial element to a crankshaft connected driving element. Such dampers generally damp a particularly undesirable crankshaft torsional frequency and are known as harmonic or tuned dampers. While useful for suppressing torsional vibration at a critical crankshaft speed, such dampers often cause new vibrations or increase vibrations at crankshaft speeds above and below the speed at which the original torsional vibration took place. The resultant torsional vibrations often approach or exceed an objectionable level.

To avoid the difficulties experienced with resilient or frictionally tuned dampers, substantially untuned viscous fluid dampers have been developed. Such dampers further provide the broad spectrum torsional vibration damping characteristics necessary in certain critical engine applications. However, these dampers are substantially more expensive to manufacture due to the relative close manufacturing tolerances required than the conventional harmonic damper. They are also susceptible to a marked deterioration of their vibration damping ability with use due to wear or erosion between the relatively moveable parts, due to housing distortions, and due to high temperature and wear breakdown of the viscous fluid used.

The invention contemplates an improved torsional vibration damper which is relatively simple and inexpensive to manufacture and which is capable of providing wide spectrum torsional vibration damping characteristics and operating life comparable to or better than the more expensive viscous fluid dampers now in use.

The foregoing and other objects, advantages and features of the invention will be apparent from the following description of a preferred illustrative embodiment thereof, having reference to the accompanying drawing, in which:

FIGURE 1 is an elevational view showing a portion of a vibration damper embodying the invention with portions thereof broken away to show certain details of the construction;

FIGURE 2 is a sectional view of the damper taken substantially in the direction of the arrows and in the plane of the line indicated at 2—2 of FIGURE 1; and FIGURE 3 is a fragmentary sectional view similar to a portion of FIGURE 2 and shows a modified form of the invention.

Referring more particularly to FIGURES 1 and 2, the vibration damper is indicated generally by the reference numeral 10 and comprises a hub 12 which is adapted to be drivingly secured to an engine crankshaft, not shown. A plate 14 is sandwiched between two annular rings 16 and secured therewith to a radial flange 18 carried by the crankshaft driven hub 12. The two rings 16 are interchangeable and reversible end-for-end in assembly and terminate peripherally in frusto-conical surfaces 20 sloping slightly toward the interposed plate 14. Outwardly of the rings 16, the plate 14 is provided with a plurality of equiangularly and radially spaced holes 22 and 24. These holes serve to mount a plurality of friction shoe elements 26 on opposite sides of the plate. The shoe elements of the illustrative embodiment are preferably formed of a metallic particle impregnated ceramic friction material 27 backed by a soft metal shell 28 and are centrally secured to the plate 14 by flared soft metal rivets 30 extending through the holes 22. The several friction elements are restrained from rotation by bosses 32 which are formed thereon and engage the holes 24 in the plate 14.

Two annular inertial flywheel members 34 spacedly embrace the rings 16. These flywheel members are interchangeable and have frusto-conical inner surfaces 36 disposed in parallel relation to the outer surfaces of the rings 16 in assembly. An elastic coupling or bushing 38 is interposed between and bonded respectively to the outer and inner surfaces of the rings 16 and 34 to drivingly and resiliently couple these members. These elastic bushings are of such initial configuration that they are axially loaded in assembly and cooperate to apply opposing equal longitudinal forces biasing the annular flywheel members resiliently driven thereby into frictional snubbing engagement with the several friction elements 26. The elastic couplings thus serve the dual function of resiliently driving and frictionally snubbing the inertial flywheel members 34 with respect to the crankshaft driven plate and friction elements. The damping characteristic of the elastic coupling is thus utilized in combination with the high energy absorbing ability of the frictional damping to substantially de-tune the resultant combination damper thereby providing wide spectrum frequency damping characteristics and substantially prolonging the operative life of the frictional elements.

In the modification shown in FIGURE 3, the mass of the inertial flywheel member 34' is reduced by relieving at 34''. The in-shear spring rate characteristic of the elastic bushing 38' may also be modified to further effect the vibration damping characteristic of the damper. A two-stage double damper is thus provided which is capable of torsional vibration damping effectiveness over a substantially broader frequency range than that provided by the single stage double damper of FIGURES 1 and 2.

While the foregoing description has been limited to two illustrative embodiments, it will be apparent that various modifications and changes might be made without departing from the spirit and scope of the invention as defined in the following claims.

I claim:

1. A torsional vibration damper for a rotatably driven shaft comprising a shaft driven cylindrical hub, two annular rings drivingly secured to said hub, a plate drivingly secured and extending radially outwardly of said rings, friction means carried by said plate outwardly of said rings and having frictional surfaces on opposite sides thereof, two annular inertial flywheel members spacedly embracing said rings, and elastic bushings resiliently and drivingly connecting each of said flywheel members inwardly to its respective driving ring and biasing said flywheel members into vibration damping engagement with said frictional surfaces.

2. In a vibration damper as set forth in claim 1, said inertial flywheel members being interchangeable and of equal mass and said elastic bushings exerting equal opposed biasing forces on their respective flywheel members thereby effecting balanced frictional engagement with the frictional surfaces.

3. In a vibration damper as set forth in claim 1, said driven inertial flywheel members being of unequal mass.

4. In a vibration damper as set forth in claim 1, the axial loading imposed on said elastic bushings being unequal thereby exerting unequal frictional engagement between the two flywheel members and the frictional elements engaged thereby.

5. In a vibration damper as set forth in claim 4, said driven inertial flywheel members being of unequal mass.

6. A torsional vibration damper for a rotatably driven shaft comprising a shaft driven hub, two annular rings drivingly secured to said hub, a plate drivingly secured and extending radially outwardly of said rings and having a plurality of frictional elements carried thereby in equiangularly spaced relation to each other and having frictional surfaces on opposite sides thereof, said friction elements being of a suitable metallic particle impregnated high temperature resistant ceramic material, two annular inertial flywheel members spacedly embracing said rings, and elastic bushings resiliently and drivingly connecting each of said flywheel members inwardly to its respective driving ring and biasing said flywheel members into frictional vibration damping engagement with said friction elements.

7. In a vibration damper as set forth in claim 6, said driven inertial flywheel members being of unequal mass.

8. In a vibration damper as set forth in claim 6, the axial loading imposed on said elastic bushings being unequal thereby exerting unequal frictional engagement between the two flywheel members and the frictional elements engaged thereby.

9. In a vibration damper as set forth in claim 6, said driven inertial flywheel members being of unequal mass, and the axial loading imposed by said elastic bushings being unequal thereby exerting unequal frictional engagement between the two flywheel members and the frictional elements engaged thereby.

10. A torsional vibration damper mountable on an engine crackshaft or the like comprising a cylindrical shaft driven hub, a plate drivingly connected to said hub and extending radially outwardly therefrom, frictional surface means carried by said plate outwardly of said hub, an annular inertial flywheel member spacedly embracing said cylindrical hub adjacent said frictional surface means and an elastic bushing interposed between and resiliently and drivingly connecting said flywheel member to said shaft driven hub and resiliently biasing said flywheel member longitudinally into frictional vibration damping engagement with said frictional surface means.

11. A torsional vibration damper for a driven shaft including a plate drivingly connected to said shaft and extending radially outwardly therefrom, frictional surface means carried by said plate outwardly of said shaft, an annular inertial flywheel member spacedly embracing said shaft adjacent said frictional surface means and an elastic bushing resiliently mounting and drivingly connecting said flywheel member to said shaft and resiliently biasing said flywheel member longitudinally into frictional vibration damping engagement with said frictional surface means.

References Cited in the file of this patent

UNITED STATES PATENTS 2,041,556    Lee  ------------------- May 19, 1936

FOREIGN PATENTS 389,065    Great Britain ---------- June 1, 1931
742,778    Germany -------------- Dec. 10, 1943